United States Patent
Piyabongkarn et al.

(10) Patent No.: US 7,337,053 B2
(45) Date of Patent: Feb. 26, 2008

(54) STABILITY-ENHANCED TRACTION CONTROL WITH ELECTRICALLY CONTROLLED CENTER COUPLER

(75) Inventors: Damrongrit Piyabongkarn, Medina, MN (US); John A. Grogg, LaOtto, IN (US); Qinghui Yuan, Maple Grove, MN (US); Jae Y. Lew, Shorewood, MN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/702,882

(22) Filed: Feb. 6, 2007

(65) Prior Publication Data

US 2007/0192011 A1 Aug. 16, 2007

Related U.S. Application Data

(60) Provisional application No. 60/773,493, filed on Feb. 15, 2006.

(51) Int. Cl.
*B60T 8/52* (2006.01)

(52) U.S. Cl. .................. 701/70; 180/233

(58) Field of Classification Search .............. 701/37, 701/38, 53, 69; 180/233, 248, 249, 250; 192/35, 85 AA
See application file for complete search history.

(56) References Cited

U.S. PATENT DOCUMENTS

| | | | |
|---|---|---|---|
| 4,790,404 A | 12/1988 | Naito | |
| 5,450,919 A | 9/1995 | Shitani | |
| 6,549,840 B1 * | 4/2003 | Mikami et al. | 701/69 |
| 6,725,989 B1 * | 4/2004 | Krisher et al. | 192/35 |
| 6,752,233 B1 | 6/2004 | Shakespear | |
| 6,996,466 B2 | 2/2006 | Bastian et al. | |
| 7,004,870 B2 * | 2/2006 | Kroppe | 475/86 |
| 7,175,557 B2 * | 2/2007 | Kirkwood et al. | 475/150 |
| 7,211,019 B2 * | 5/2007 | Kirkwood et al. | 475/205 |
| 2004/0035622 A1 | 2/2004 | Ito et al. | |

FOREIGN PATENT DOCUMENTS

| | | |
|---|---|---|
| DE | 103 33 654 | 2/2005 |
| EP | 1 203 687 | 5/2002 |
| EP | 1 403 157 | 3/2004 |

OTHER PUBLICATIONS

PCT Search Report dated Aug. 6, 2007 for European Patent Application No. PCT/IB2007/000341.

* cited by examiner

*Primary Examiner*—Dalena Tran
(74) *Attorney, Agent, or Firm*—Bradley J. Diedrich

(57) ABSTRACT

A control system for a vehicle having first and second axles is provided that includes a coupling apparatus adapted to distribute torque between the first and second axles and a traction controller for controlling operation of the differential apparatus from vehicle launch up to a predetermined vehicle speed. The traction controller is configured to engage the coupling apparatus in a first operating state according to at least one vehicle operating parameter indicative of a low traction operating condition and to further control engagement of the coupling apparatus in a second vehicle operating state during the low traction operating condition according to a difference between an actual vehicle yaw rate and a predetermined target vehicle yaw rate.

4 Claims, 6 Drawing Sheets

STABILITY-ENHANCED TRACTION CONTROL WITH ELECTRICALLY CONTROLLED CENTER COUPLER

CROSS-REFERENCE TO RELATED APPLICATIONS

The present application claims priority to U.S. Provisional Patent Application Ser. No. 60/773,493, which was filed on Feb. 15, 2006 and is incorporated herein by reference in its entirety.

BACKGROUND OF THE DISCLOSURE

The present invention relates to vehicle control systems that enhance vehicle stability.

Vehicle stability-control systems are being increasingly used in the automotive industry and are becoming standard equipment in many vehicles. A majority of the vehicle stability-control systems in the market are brake-based. Brake-based stability-control systems use Anti-Lock Braking System (ABS) hardware to apply individual wheel braking forces to correct vehicle yaw dynamics. While brake-based systems are acceptable in many situations, they tend to deteriorate longitudinal performance of the vehicle, especially during vehicle acceleration.

BRIEF SUMMARY OF THE INVENTION

A control system for a vehicle having first and second axles is provided that includes a coupling apparatus adapted to distribute torque between the first and second axles, and a traction controller for controlling operation of the coupling apparatus from vehicle launch up to a predetermined vehicle speed. The traction controller is configured to engage the coupling apparatus in a first vehicle operating state according to at least one vehicle operating parameter indicative of a low traction operating condition and to further control engagement of the coupling apparatus in a second vehicle operating state during the low traction operating condition according to a difference between an actual vehicle yaw rate and a predetermined target vehicle yaw rate.

An embodiment of the present invention includes an active stability control method using a coupling apparatus to enhance the vehicle lateral dynamics while preserving longitudinal motion. Another embodiment of the present invention includes a control system that provides stability enhancement of the traction control. The stability-enhanced traction control was evaluated under the condition of an on-throttle, T-junction vehicle launch. The experimental data shows a significant stability improvement in the traction control operating mode.

DETAILED DESCRIPTION

Figure 1:
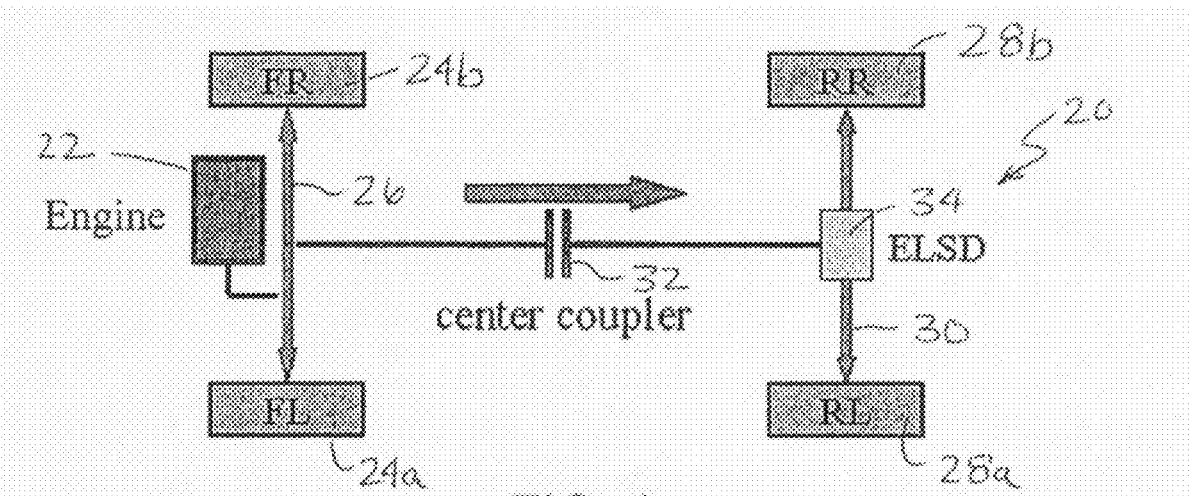
FIG. 1 is a schematic illustration of an exemplary all-wheel-drive vehicle drive-train configuration.

Referring now to the drawings, which are not intended to limit the invention, FIG. 1 schematically illustrates an exemplary all-wheel-drive vehicle drive-train configuration 20 including a laterally-positioned engine 22. The engine 22 is linked to a pair of front wheels 24a, 24b through a front axle or transaxle 26 and to a pair of rear wheels 28a, 28b through a rear axle 30. The front axle 26 is primarily and directly driven by the engine 22. The rear axle 30 is indirectly driven via a power transfer unit (PTU) and a center coupling apparatus or coupler 32. The rear axle 30 is mechanically linked to the front transaxle 26 through one or more drive- or prop-shafts. An optional electronically controlled limited slip differential (ELSD) 34 is used to bias the rear prop-shaft torque to the rear wheels 28a, 28b. While, the drive-train configuration illustrated in FIG. 1 is a normally front-drive configuration in which torque is transmitted to the rear axle 30 on-demand, the invention is not intended to be limited thereto and may include a normally rear-drive configuration.

Figure 2:
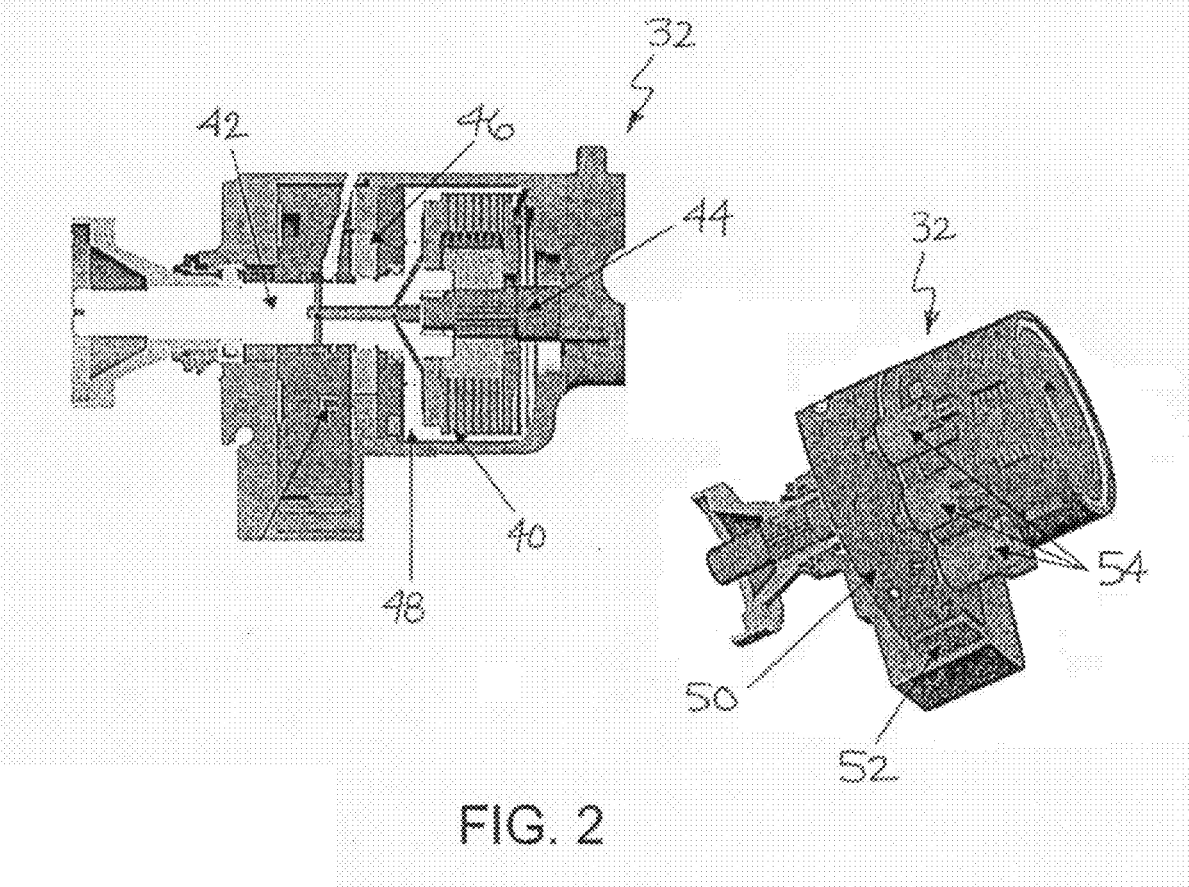
FIG. 2 is an exemplary electronically controlled coupling apparatus for use in a control system according to an embodiment of the present invention.

The center coupler 32, such as an electronically controlled center coupler manufactured by Eaton Corporation under the name HTC-I™ and illustrated in FIG. 2, is connected to the prop-shaft and is adapted to transmit torque from the front transaxle 26 to the rear axle 30. The exemplary locking center coupler 32 shown in FIG. 2 is an electronically controlled all-wheel-drive coupler designed as an integrated component of the vehicle's rear axle drive module. The center coupler 32 transfers power smoothly and rapidly from the vehicle prop-shaft to a hypoid pinion gear of the rear drive module in response to input signals from an electronic control unit (ECU).

Referring to FIG. 2, power transfer is provided by an actively controlled wet multi-plate clutch 40 disposed between a coupling shaft 42, to which the vehicle's prop-shaft is attached, and a hypoid pinion gear 44. Clutch engagement limits the slip between the vehicle's prop-shaft and the hypoid pinion gear 44 and, in doing so, torque is transferred from the prop-shaft to the hypoid pinion gear 44, the magnitude of which will be less then or equal to the clutch torque. A gerotor-type on-board hydraulic oil pump 46 provides hydraulic pressure to actuate a clutch piston 48 when coupling shaft 42 is rotating. A stationary hydraulic manifold 50 includes an oil inlet 52 through which pump 46 draws oil from a sump for discharge into a passage in direct communication with both piston 48 and at least one solenoid operated pressure regulation valve 54. When the valve 54 are de-energized, oil flows freely through the valve and back to the sump, resulting in little or no hydraulic pressure against the clutch actuation piston 48. When valve 54 is energized, oil flow is restricted by the valve creating hydraulic pressure against the actuation piston 48 to engage the clutch 40 according to a level proportional to that of the hydraulic pressure. Further details regarding the structure and operation of center coupler 32 are described in pending U.S. patent application Ser. No. 11/167,474, which is owned by the Assignee of the present invention and incorporated herein by reference in its entirety.

The locking center coupler 32 provides fast coupling torque application and removal as is desired for both driveline torque control-based vehicle dynamic operations (as is the focus of the present invention), and also for compatibility with many of the current brake-based vehicle dynamic intervention systems. To support this operation, the center coupler 32 exhibits engagement and disengagement times of less than about 50 milliseconds. In a mode of operation, torque is transmitted from the front transaxle 26 to the rear axle 30 if the front axle wheel speed is greater than the rear axle wheel speed and positive engine torque is being delivered to the drive-train (e.g., engine is being throttled).

Figure 3:
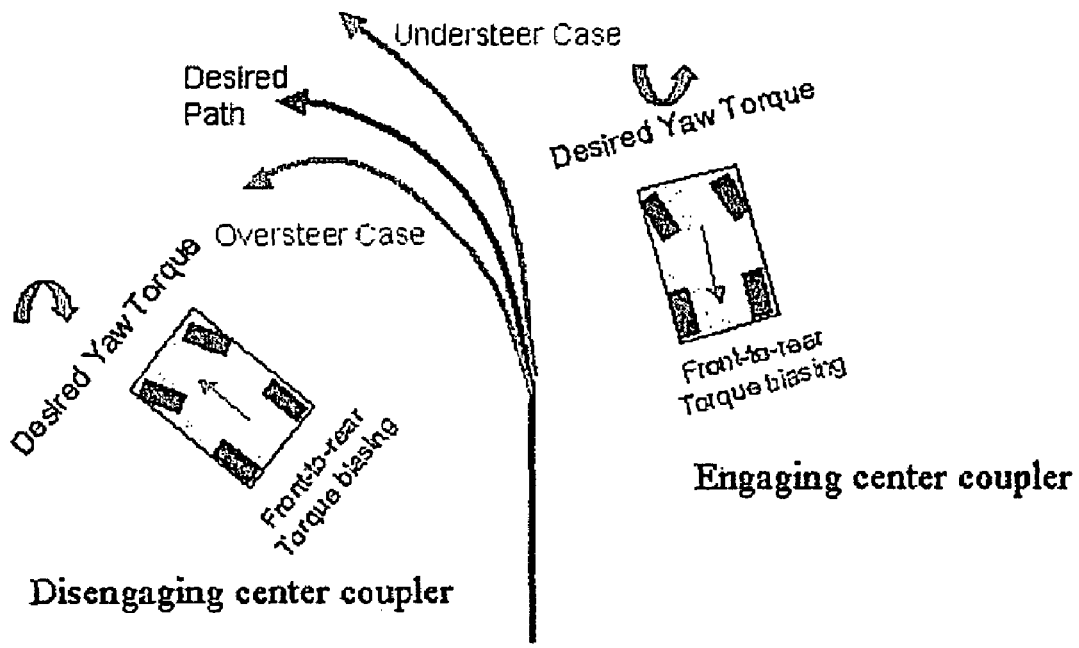
FIG. 3 illustrates the dynamics of an exemplary vehicle employing an electronically controlled center coupling apparatus and the effect on vehicle yaw control when disengaging and engaging the electronically controlled center coupling apparatus.

During vehicle operation, the center coupler 32 is periodically engaged or locked to transfer torque from the front axle 26 to the rear axle 30. This operation is performed to maintain vehicle traction. For vehicle traction control, the extent to which the center coupler 32 is engaged may be based on, without limitation, the vehicle throttle position and the degree of front wheel slip (e.g., the greater the slip, the greater the engagement). However, operating the center coupler 32 during a T-junction (junction between two road surfaces that intersect at a right angle) launch or during a severe turn with the engine under heavy throttle enforces oversteer behavior in the vehicle or introduces large slip angles at the vehicle's rear wheels. FIG. 3 illustrates the dynamics of an exemplary vehicle employing a center coupler and the effect on vehicle yaw control when disengaging and engaging the center coupler.

In accordance with an embodiment of the present invention, a control system 58 and method for controlling engagement of a center coupler is provided to maintain stability in a vehicle while preserving traction. The control system 58 and method of the present invention modulates center coupler engagement based on a difference between a desired yaw rate and the actual vehicle yaw rate. Actively controlling engagement of the center coupler, and accordingly the amount of torque transmitted by the center coupler, mitigates vehicle oversteer behavior that induces undesirable vehicle yaw motion. The present invention controls the center coupler during launch and acceleration to preserve both driveline power and yaw stability.

Figure 4:
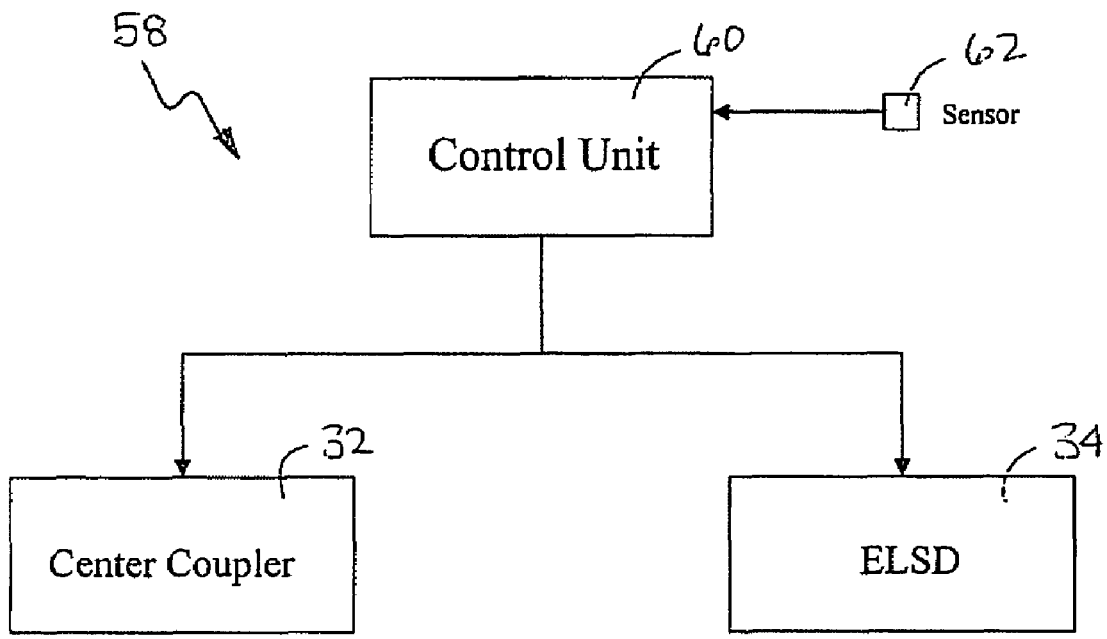
FIG. 4 is a schematic illustration of a control system according to an embodiment of the present invention.

As shown in FIG. 4, the control system includes a control unit 60, such as a microprocessor-based electronic control unit (ECU) including a memory device having stored therein, for example, one or more maps containing vehicle operating parameter information, and at least one vehicle sensor 62, such as, without limitation, a yaw rate sensor, wheel speed sensor, lateral acceleration sensor and/or a steering angle sensor. The control unit provides an input signal to the center coupler 32 and the ELSD 34 to control engagement and disengagement of the devices. A method of controlling the ELSD 34 is disclosed in a co-pending U.S. patent application entitled "Stability-Enhanced Traction and Yaw Control using Electronically Controlled Limited-Slip Differential," which is owned by the Assignee of the present invention and incorporated herein by reference in its entirety.

Figure 5:
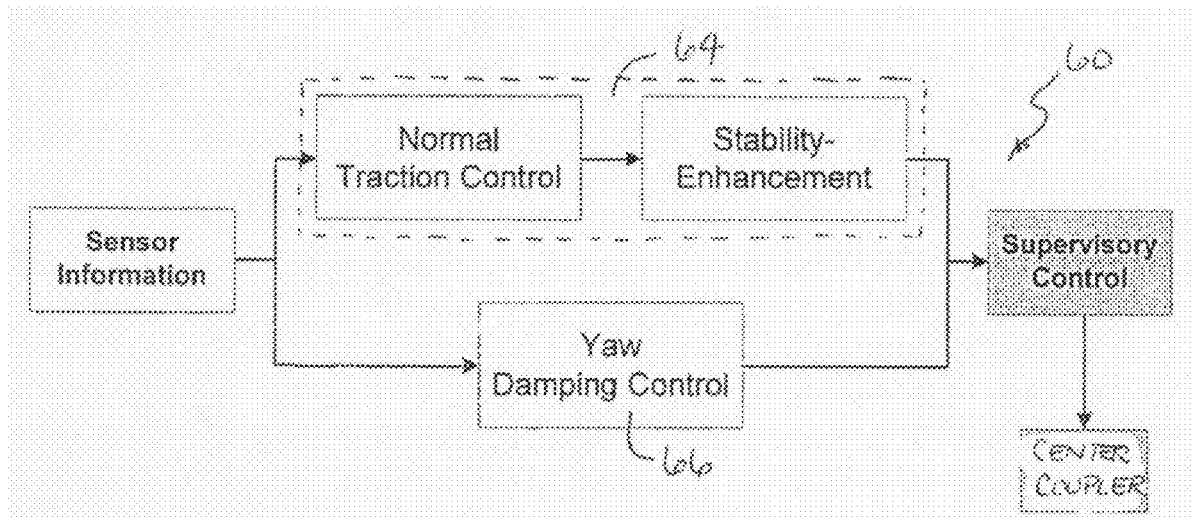
FIG. 5 is a schematic illustration of an electronic control unit according to an embodiment of the present invention for use in the control system of FIG. 4.

In an embodiment of the invention shown in FIG. 5, the control unit 60 includes a traction controller 64 for controlling operation of the center coupler from vehicle launch up to a predetermined vehicle speed. The traction controller 64 is configured to engage the coupling apparatus in a first vehicle operating state according to at least one vehicle operating parameter, such as wheel speed, indicative of a low traction operating condition and to further control engagement of the coupling apparatus in a second vehicle operating state during the low traction operating condition according to a difference between the actual vehicle yaw rate and a predetermined target or desired vehicle yaw rate. The electronic control unit 60 may also include a stability controller 66 for controlling engagement of the coupling apparatus at or above the predetermined vehicle speed. Traction controller 64 and stability controller 66 may be hardware provided in communication with control unit 60, made integral within control unit 60, or form a non-hardware component (e.g., software) of control unit 60 or other vehicle controller.

During vehicle operation, the actual yaw rate is periodically or continuously compared to the desired yaw rate. The actual yaw rate may be measured using a yaw rate sensor or may be calculated based on vehicle operating parameter information received from various vehicle sensors, as is known in the art. The desired yaw rate may be stored in a map in the control system memory or may also be calculated based on the vehicle operating parameter information received from various vehicle sensors.

The center coupler locking torque required to maintain vehicle stability and traction may be determined according to the following equation:

$$\tau_{des} = \tau_{nom} \times \frac{\Delta r_{max} - |deadband_{\pm \Delta r_{threshold}}(r - r_{des})|}{\Delta r_{max}}$$

wherein $\tau_{des}$ is the desired center coupler locking torque, $\tau_{nom}$ is the normal center coupler locking torque, $\Delta r_{max}$ is a predetermined maximum yaw rate difference, r is the actual yaw rate, and $r_{des}$ is the predetermined target or desired yaw rate, and deadband is a threshold function for the yaw rate difference allowed, $\Delta r_{threshold}$. The control unit 60 then converts the desired locking torque value into an input signal, which is communicated to the center coupler 32 for control. During vehicle operation, if the vehicle is experiencing excessive oversteer (see, e.g., FIG. 3), the center coupler locking torque is reduced in proportion to the degree of vehicle oversteer.

Figure 6:
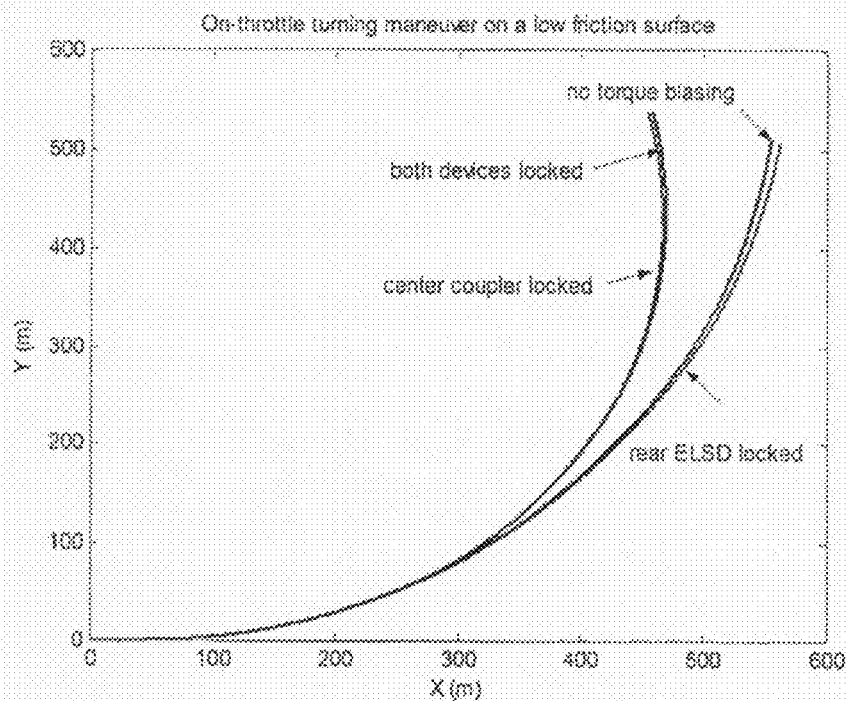
FIGS. 6 and 7 graphically illustrate a performance comparison for an on-throttle vehicle turning maneuver on a low friction surface for a vehicle employing a center coupler.
Figure 7:
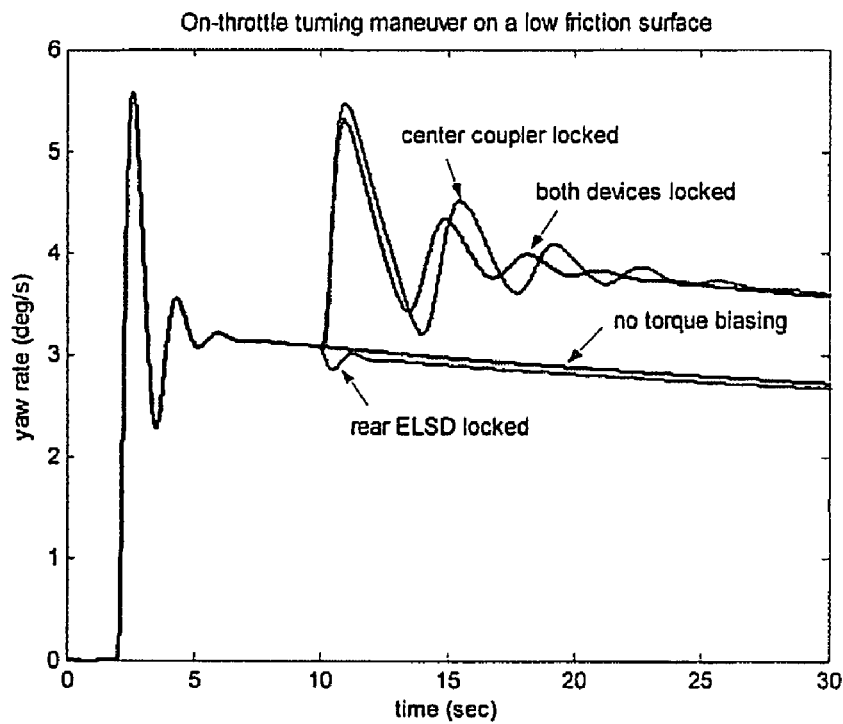

To simulate performance of the proposed control system with the exemplary drive-train configuration shown in FIG. 1, a full vehicle model employing a center coupler and an ELSD was developed using CarSim software. A simulated turning maneuver was first performed to validate the effect of engaging the center coupler 32 and ELSD 34 on vehicle yaw dynamics. FIGS. 6 and 7 graphically illustrate a performance comparison for an on-throttle turning maneuver on a low friction surface (e.g., μ=0.2). As shown in FIG. 6, locking the center coupler 32 during an on-throttle turning maneuver induces less understeer. By contrast, locking the rear axle ELSD has little or no effect on the vehicle dynamics on a low friction surface.

Figure 8:
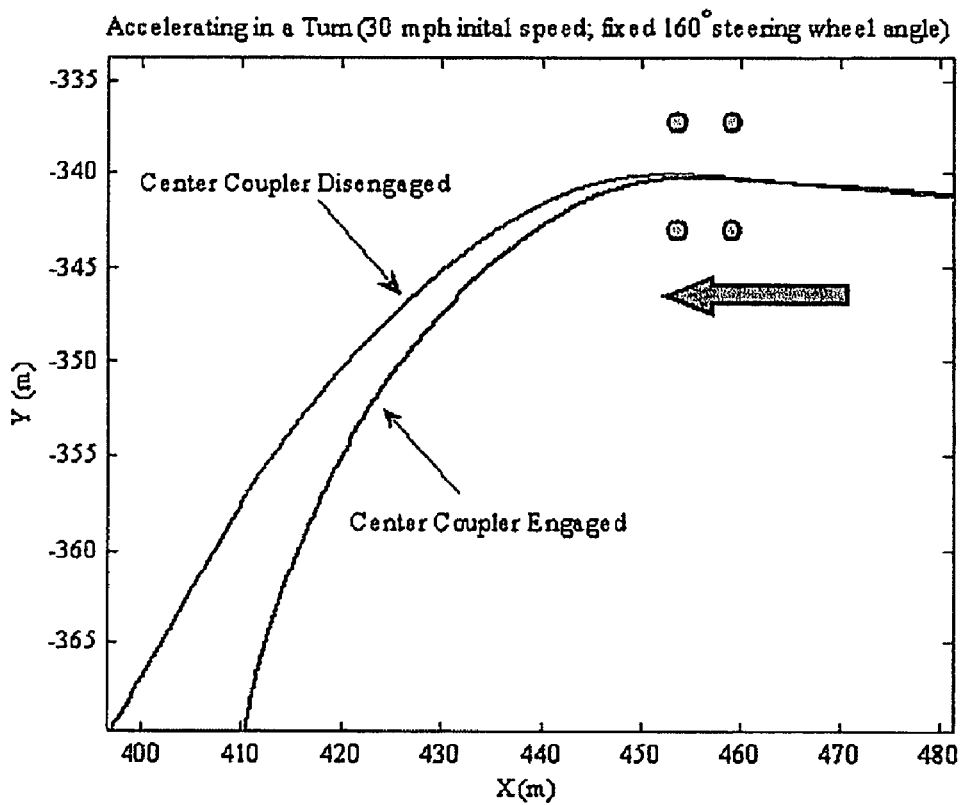
FIGS. 8 and 9 graphically illustrate a performance comparison for an on-throttle turning maneuver on a low friction surface using a vehicle employing a center coupler.
Figure 9:
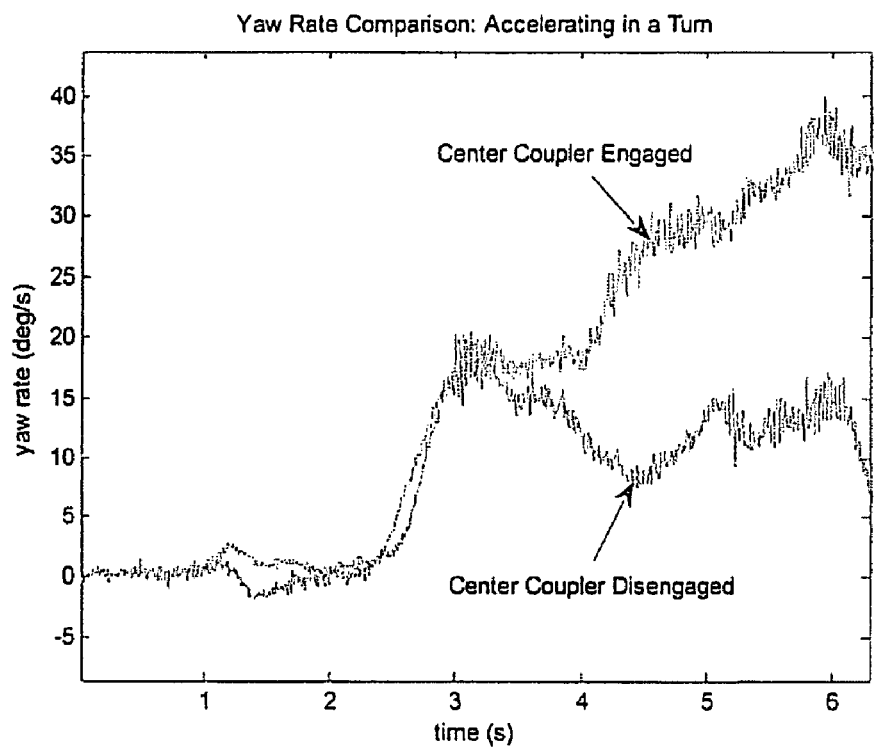

FIGS. 8 and 9 graphically illustrate a performance comparison for an on-throttle turning maneuver on a low friction surface (e.g., μ=0.2) using a test vehicle employing a center coupler according to the present invention. As shown in FIG. 8, engaging the center coupler 32 during an on-throttle turning maneuver again induces less understeer compared to a similar maneuver with the center coupler disengaged.

Figure 10:
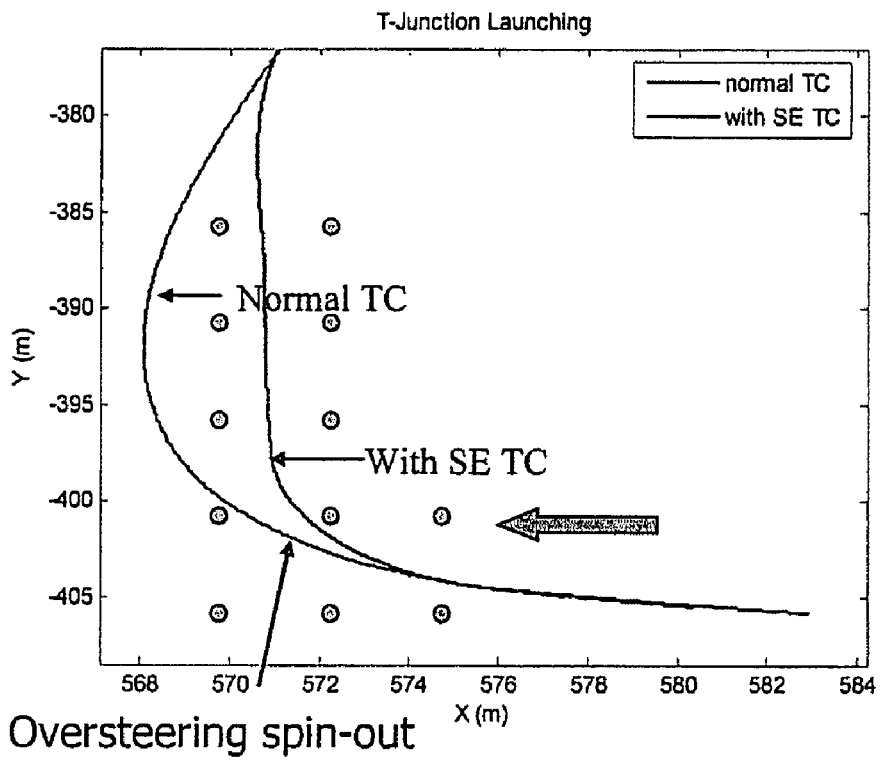
FIGS. 10 and 11 graphically illustrate a performance comparison for an on-throttle T-junction vehicle launch using a vehicle employing a control system according to an embodiment of the present invention.
Figure 11:
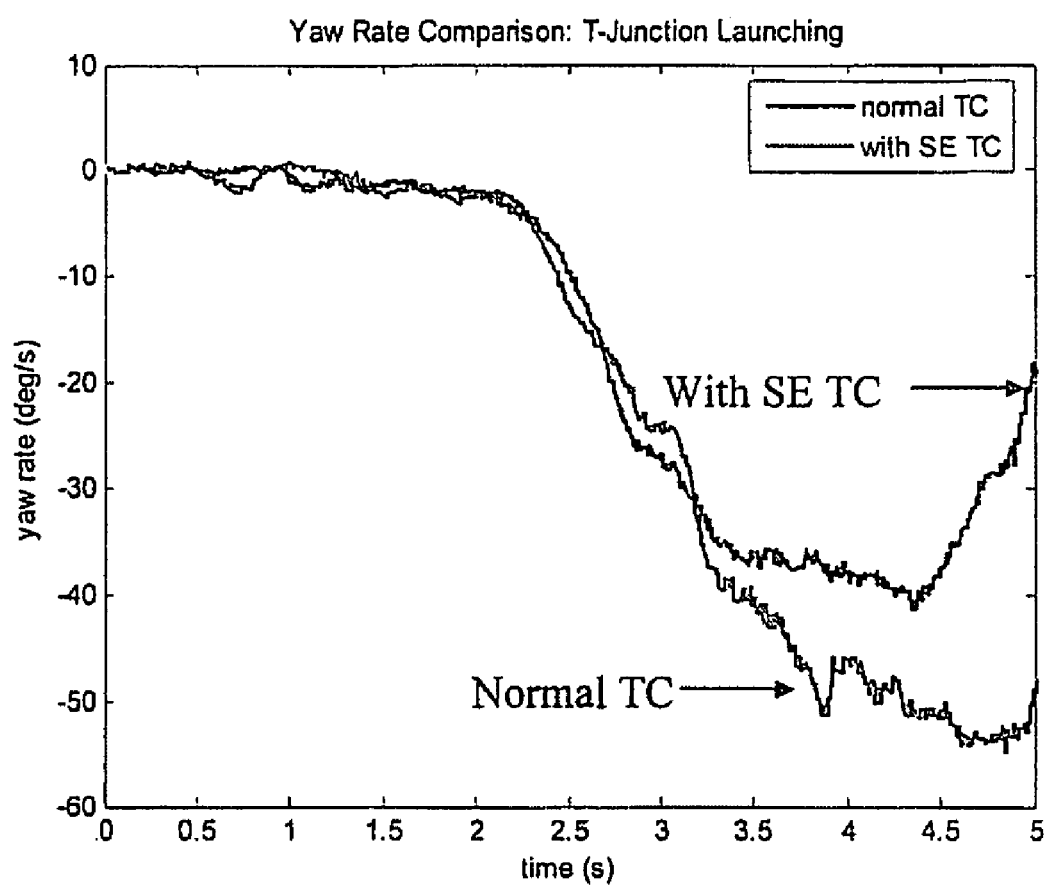

FIGS. 10 and 11 graphically illustrate a performance comparison for an on-throttle T-junction vehicle launch using a test vehicle employing a control system according to the present invention and a test vehicle without stability-enhanced traction control. As shown in FIG. 10, actively controlling engagement of the center coupler during vehicle launch using the stability-enhanced traction control (SE TC) according to an embodiment of the invention induces significantly less understeer compared to a similar maneuver in which the center coupler is not actively controlled. It will also be appreciated with reference to FIGS. 10 and 11 that a vehicle without stability-enhanced traction control may exhibit too large a reduction in understeer. In both stability-controlled and non-stability controlled modes of operation, some degree of torque is transferred from the front axle 26 to the rear axle 30 by the center coupler 32. Unlike ABS-based stability-control systems that dissipate vehicle energy, thereby degrading the vehicle performance and efficiency, the control system and method according to the present invention maintains vehicle stability while preserving vehicle traction.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A control system for a vehicle having first and second axles, comprising:

a coupling apparatus adapted to distribute torque between the first and second axles;

a traction controller for controlling operation of the coupling apparatus from vehicle launch up to a predetermined vehicle speed, the traction controller configured to engage the coupling apparatus in a first vehicle operating state according to at least one vehicle operating parameter indicative of a low traction operating condition and to further control engagement of the coupling apparatus in a second vehicle operating state during the low traction operating condition according to a difference between an actual vehicle yaw rate and a predetermined target vehicle yaw rate; and wherein the traction controller is configured to engage the coupling apparatus according to a desired coupling applied torque signal that is based on a modified normal coupling applied torque signal, the desired coupling applied torque signal is equal to the normal coupling applied torque signal multiplied by a modifier, the modifier including in its numerator the difference between a predetermined maximum yaw rate difference and the multiplication of a deadband and the difference between the actual vehicle yaw rate and the predetermined target vehicle yaw rate, and the modifier including in its denominator the predetermined maximum yaw rate difference.

2. The control system of claim 1, wherein the traction controller is configured to modulate engagement of the coupling apparatus during the low traction operating condition according to a difference between the actual vehicle yaw rate and the predetermined target vehicle yaw rate.

3. The control system of claim 1, wherein in the first vehicle operating state, the actual vehicle yaw rate is less than or substantially equal to the predetermined target vehicle yaw rate and, in the second vehicle operating state, the actual vehicle yaw rate is greater than the predetermined target vehicle yaw rate.

4. The control system of claim 1, further including a stability controller for controlling engagement of the coupling apparatus at or above the predetermined vehicle speed.

* * * * *